(12) United States Patent
Glenn

(10) Patent No.: US 7,252,117 B1
(45) Date of Patent: Aug. 7, 2007

(54) REUSABLE STUB-OUT COVER

(76) Inventor: William F. Glenn, 2577 Elysium Ave., Eugene, OR (US) 97401

( * ) Notice: Subject to any disclaimer, the term of this patent is extended or adjusted under 35 U.S.C. 154(b) by 586 days.

(21) Appl. No.: 10/917,949

(22) Filed: Aug. 13, 2004

(51) Int. Cl.
*F16L 5/00* (2006.01)

(52) U.S. Cl. .................. 137/877; 285/45; 138/96 R; 52/DIG. 12

(58) Field of Classification Search .......... 137/860, 137/877; 285/45; 138/96 R; 52/DIG. 12
See application file for complete search history.

(56) References Cited

U.S. PATENT DOCUMENTS

| 3,800,486 | A | * | 4/1974 | Harvey ............... 52/98 |
| 3,847,183 | A | | 11/1974 | Meyer |
| 4,168,726 | A | * | 9/1979 | Klennert ............ 138/96 R |
| 4,399,092 | A | | 8/1983 | Snow, Sr. et al. |
| 4,553,567 | A | | 11/1985 | Telander |
| 5,076,310 | A | * | 12/1991 | Barenburg ............ 137/15.08 |
| 5,305,785 | A | * | 4/1994 | Humber ............... 137/360 |
| 5,464,114 | A | * | 11/1995 | Green ............... 220/284 |
| 5,497,584 | A | * | 3/1996 | Bergmann ............ 52/34 |
| 5,974,653 | A | * | 11/1999 | Chulick ............ 29/525.01 |
| 6,056,015 | A | | 5/2000 | Lewis |
| 6,112,770 | A | | 9/2000 | Walsh et al. |

* cited by examiner

*Primary Examiner*—John Fox
(74) *Attorney, Agent, or Firm*—Robert E. Howard

(57) ABSTRACT

A stub-out cover for protecting the outer surface of a stub-out line. The stub-out cover includes a substantially rigid, molded tubular member open at one end and closed at the other end. A plurality of flexible tab members extend from the inner wall of the tubular member inwardly toward the longitudinal axis of the tubular member. Each tab member has a height that is slightly greater than the distance between the inner wall of the tubular member and the outer surface of the stub-out to be protected. When placed onto a stub-out, the tab members bend to tightly engage the outer surface of the stub-out.

21 Claims, 2 Drawing Sheets

REUSABLE STUB-OUT COVER

BACKGROUND OF THE INVENTION

The present invention relates to a reusable stub-out cover.

In a typical plumbing installation of a sink or lavatory, the hot and cold water faucets are connected, respectively, to vertically disposed hot and cold water pipes running between studs behind the wall of the room in which the sink is installed. Either a T or a ninety-degree elbow provides a connection between the water pipe and a "stub-out" that extends horizontally outwardly through the wall. A small shut-off valve is installed on the end of the stub-out line, and a flex line is connected between the shut-off valve and the faucet.

During construction of a structure intended to include such a plumbing fixture, the water pipes and associated stub-out lines are installed prior to finish work. Finish work includes installation of walls, tile, hardwood floors or carpeting, and painting. Since the plumber must wait until such finish work is completed before installing and connecting the plumbing fixture to the stub outs, the outer ends of the stub-out lines are closed off to prevent water from passing therethrough. The stub-outs are either capped at one end in the plumber's shop, or are supplied with an integral conical seal on one end, such as stub-outs sold by Wirsbo.

During the finish work, plaster, paint, glue and other material is commonly deposited on the stub-outs. When the plumber returns to complete installation of the plumbing fixture, he/she must cut the stub-outs to the proper length to install the shut-off valves, and scrape and clean off the plaster, paint, etc. from the exposed outer surface of the stub-outs, which is laborious and time consuming.

In addition to deposits of plaster, paint, etc., stub-outs can also get scratched or dinged as work is conducted in their vicinity during finishing.

A further problem faced by the plumber installing a fixture is that it is often difficult to quickly determine which of the stub-outs is for cold water and which is for hot water, thereby slowing installation of the plumbing fixture.

SUMMARY OF THE INVENTION

It is an object of the present invention to provide a stub-out protector that prevents the accumulation of material which would otherwise have to be scraped and cleaned off the stub-out after completion of finish work, and to protect the stub-out against scratches, etc.

It is a further object of the present invention to provide a stub-out protector which enables the plumber to readily identify which stub-out is connected to hot or cold water lines, and air or oxygen lines in hospital stub-outs.

Whenever the phrase "stub-out" is used herein, it is intended to include stub-outs used with water lines, and also stub-outs used for other purposes such as medical air and oxygen line stub-outs used in hospitals.

The stub-out cover of the present invention includes a substantially rigid, molded cylindrical body which is open at one end and closed at the other end.

A plurality of flexible tab members extend inwardly from the inner wall of the tubular member toward the longitudinal axis of the tubular member.

The tab members are preferably arranged along the longitudinal axis of the cylindrical body in sets of at least two tab members. The tab members in each set are located within the same plane, which plane is substantially perpendicular to the longitudinal axis of the stub-out cover.

Each tab member has a height that is slightly greater than the distance between the inner wall of the tubular member and the outer surface of the stub-out to be protected.

When placed onto a stub-out, the tab members bend to tightly engage the outer surface of the stub-out.

DESCRIPTION OF PREFERRED EMBODIMENTS

Figure 1:
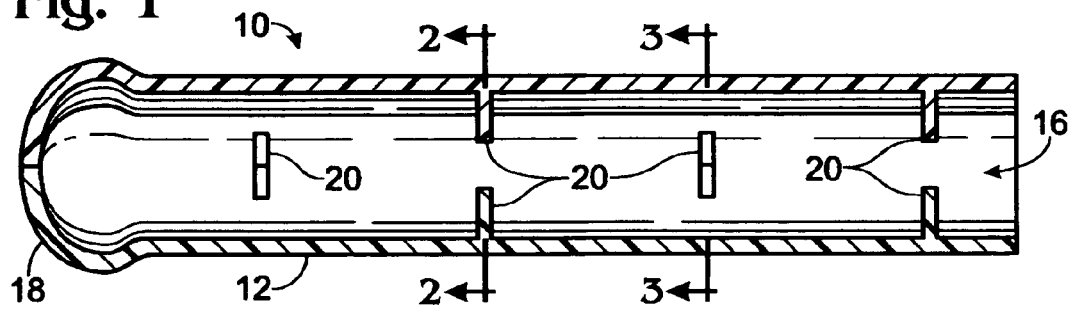
FIG. 1 is a side elevational view, in cross-section, of the stub-out cover of the present invention.

Tubular stub-out cover 10 of the present invention includes a cylindrical body 12 having an inner and outer surface, an open end 16, and a closed end or head 18.

A plurality of flexible tab members 20 extend from the surface of inner wall 12 inwardly toward the longitudinal axis of tubular stub-out cover 10. The tab members 20 are preferably arranged along the length of tubular stub-out cover 10 in sets of at least two tab members 20 lying in the same plane, which plane is substantially perpendicular to the longitudinal axis of tubular stub-out cover 20.

The tab members 20 of each set are spaced apart a substantially equal distance. Where each set of tab members 20 includes two tab members, they are spaced substantially opposite each other at substantially 180 degrees apart.

The location on the inner surface of tubular member 12 of the tab members 20 of one set are offset from the location on the inner surface of tab members 20 of adjacent sets to maximize circumferential contact between tab members 20 and the outer surface of a stub-out over which the stub-out cover 10 is placed. For example, where each set of tab members 20 includes two tab members, the tab members 20 of the set illustrated in FIG. 2 are rotated substantially 90 degrees from the two tab members 20 of the adjacent set illustrated in FIG. 3, i.e., the location on the inner surface of tubular member 12 of tab members 20 of the set illustrated in FIG. 2 are substantially 90 degrees out-of-phase with the location on the inner surface of tubular member 12 of tab members 20 of the adjacent set illustrated in FIG. 3.

Figure 2:
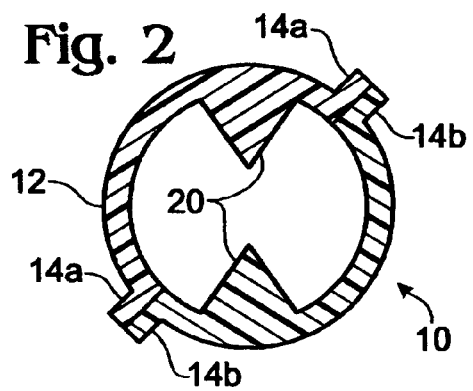
FIG. 2 is an enlarged front elevational view taken along line 2-2 of FIG. 1.
Figure 3:
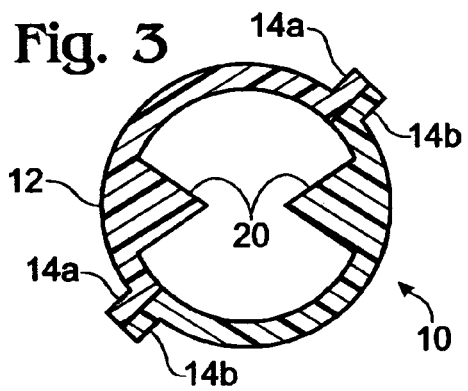
FIG. 3 is an enlarged front elevational view taken along line 3-3 of FIG. 1.
Figure 4:
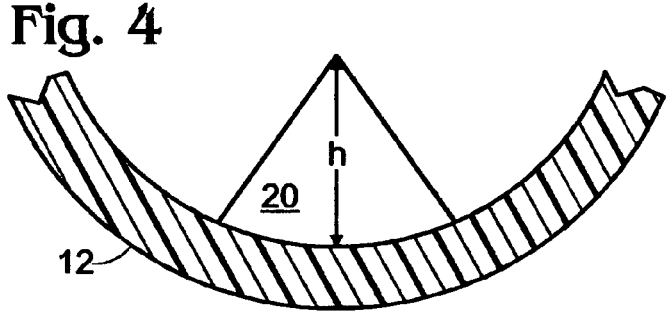
FIG. 4 is an enlarged, partial, front elevational view of a single tab.

Tab members 20 are preferably triangular shaped, as shown in FIGS. 2-4. However, other outer perimeter shapes may be used, such as an arc of a circle, elliptical, trapezoidal, square, rectangular, etc. Tab members 20 have a height "h" (FIG. 4) above the inner surface of wall 12 of tubular stub-out cover 10 that is greater than the distance "d" (FIG. 5) between said inner surface and the outer surface of a stub-out line 30 or 130 to be covered.

Figure 6A:
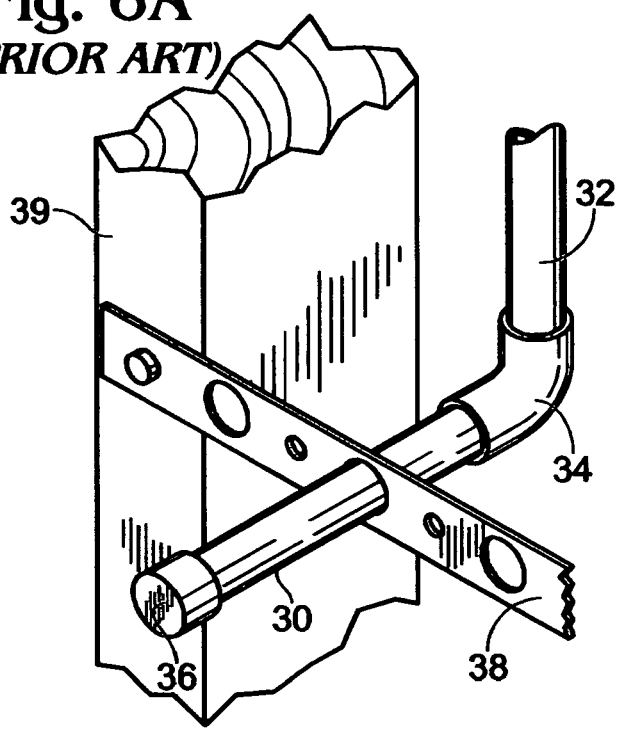
FIG. 6A is a perspective view of a first type of prior art stub-out.

FIG. 6A shows a first conventional type of a stub-out line 30. Stub-out line 30 is connected to a water supply line 32 by ninety degree elbow 34. Stub-out line 30 has a nipple 36 attached to its outer end, such as by soldering. Stub-out line 30 is supported by a strap 38 extending between and attached to adjacent studs, only one such stud 39 being shown.

Figure 6B:
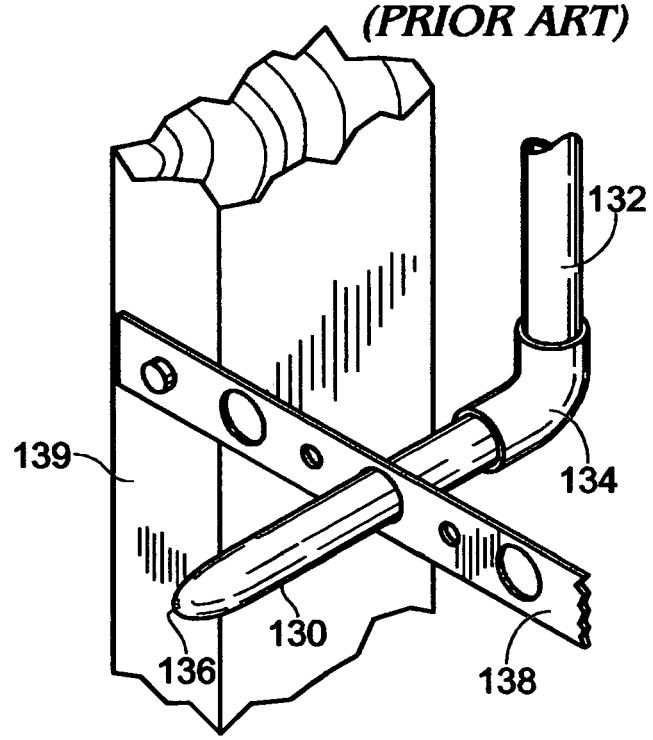
FIG. 6B is a perspective view of a second type of prior art stub-out.

FIG. 6B shows a second conventional type of a stub-out line 130. Stub-out line 130 is connected to a water supply line 132 by ninety degree elbow 134. Stub-out line 130 has a sealed conical tip 136 at its outer end, tip 36 being integral with stub-out line 130. Stub-out line 130 is supported by a strap 138 extending between and attached to adjacent studs, only one such stud 139 being shown.

Figure 5:
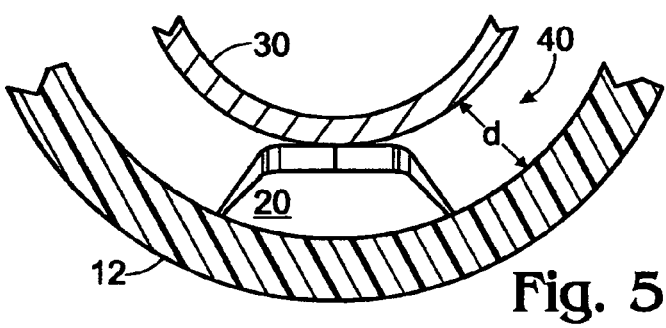
FIG. 5 is an enlarged, partial, front elevational view of the stub-out cover of the present invention positioned over a stub-out.

A stub-out cover 10 is placed over either stub-out 30 or stub-out 130 by inserting stub-out tip 36 or 136 into the open end 16 of stub-out cover 10, and applying a turning and pushing motion to stub-out cover 10 as it is inserted over stub-out 30 or 130. As stub-out cover 10 is positioned over stub-out 30 or 130, tab members 20 bend and tightly engage the outer surface of the stub-out, as best seen in FIG. 5.

Tab members 20 create a space 40 between the inner surface of cylindrical body 12 and the outer surface of a stub-out 30 or 130 being covered, to thereby minimize the possibility of solvent or other materials from penetrating stub-out cover 10 and coming into contact with the stub-out 30 or 130 being protected. This is very important for plastic stub-outs made of PEX or PVC since contact with paint or lacquer voids the typical 25 year warranty. Such plastic stub-outs currently account for about 90% of the stub-out market.

Stub-out cover 10 is removed from stub-outs 30 or 130 by applying a turning and pulling motion to stub-out cover 10 as it is being removed from stub-out 30 or 130.

Stub-out cover 10 preferably has an enlarged head 18, as seen in FIG. 1 to make it more suitable for use with stub-outs 30 which have a nipple sealed end 36. The interior diameter of enlarged head 18 would substantially be the outside diameter of nipple sealed end 36.

Stub-outs come in different diameters, typically ½ inch (most common), ¾ inch (water heaters) and 1 inch (commercial). The internal diameter of the stub-out cover 10 is larger than the outside diameter of the stub-out 30 or 130 with which it is to be used, with tab members 20 having a height "h" slightly greater than the distance "d" between the inside wall of the stub-out cover and the outside wall of the stub-out.

Stub-out cover 10 is preferably made of a rigid plastic, such as polyethylene, polyvinyl chloride, or nylon. Tab members 20 are the same type of plastic, and are molded integral with the cylindrical body 12 of the stub-out cover 10. The cylindrical body 12 of stub-out cover 10 is molded in two, semi-cylindrical halves which are welded or glued together along mating flanges 14a and 14b. Flanges 14a and 14b serve the additional purpose of providing a user with a better grip during placement and removal of the stub-out cover 10 onto or from a stub-out line 30 or 130.

Stub-out cover 10 is preferably color-coded to indicate the nature of the fluid to be conducted through the stub-out. For example, red stub-out covers would be used for covering hot water line stub-outs, and blue stub-out covers would be used for covering cold water line stub-outs. In hospital construction or renovation, yellow would be used for the medical air line stub-out covers and green for the oxygen line stub-out covers. Such color coding allows the plumber to quickly identify the nature of the lines for correct connection to the fixture being installed.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A stub-out cover for protecting the outer surface of a stub-out line having a predetermined outside diameter, said stub-out cover comprising:
   a substantially rigid tubular member open at one end and closed at the other end, said tubular member having a longitudinal axis and a wall with inner and outer surfaces; and
   a plurality of flexible tab members extending inwardly from said inner surface of said wall of said tubular member toward said longitudinal axis thereof, each of said tab members being substantially flat with a major plane that is substantially perpendicular to said longitudinal axis of said tubular member.

2. The stub-out cover of claim 1 wherein each of said tab members has a triangular shape.

3. The stub-out cover of claim 1 wherein said tubular member has an inside diameter larger than the outside diameter of the stub-out line to be protected, said tab members having a height greater than the distance between said inner wall of said tubular member and the outer surface of said stub-out line, whereby when said stub-out cover is placed over said stub-out, said tab members bend to tightly engage said outer surface of said stub-out.

4. The stub-out cover of claim 1 wherein said tab members are arranged along the longitudinal axis of said tubular member in sets of at least two, said tab members of each of said sets being located in the same plane.

5. The stub-out cover of claim 4 wherein the location on the inner surface of said tubular member of the tab members of one set are offset from the location on the inner surface oft members of adjacent sets in a manner adapted to maximize circumferential contact of the outer surface of a stub-out over which the stub-out cover is placed.

6. The stub-out cover of claim 4 wherein each of said sets are comprised of two tab members located substantially opposite each other.

7. The stub out cover of claim 6 wherein the location on the inner surface of said tubular member of the tab members of one set are substantially 90 degrees out-of-phase with the location on the inner surface of said tubular member of the tab members of adjacent sets.

8. The stub-out cover of claim 1 wherein said closed end of said tubular member is enlarged and adapted to receive the closed end of a nipple sealed stub-out.

9. The stub-out cover of claim 1 wherein said tubular member is coded to indicate the nature of the fluid to be conducted through said stub-out.

10. The stub-out cover of claim 9 wherein said tubular member is color coded.

11. The stub-out cover of claim 10 wherein said tubular member is colored blue to indicate a cover for a cold water line stub-out, colored red to indicate a cover for a hot water line stub-out, colored yellow to indicate a medical air line stub-out, and colored green to indicate an oxygen line stub-out.

12. A stub-out cover for protecting the outer surface of a stub-out line having a predetermined outside diameter, said stub-out cover comprising:
   a substantially rigid, molded tubular member open at one end and closed at the other end, said tubular member having a longitudinal axis and a wall with inner and outer surfaces; and a plurality of tab members extending inwardly from said inner surface of said wall of said tubular member toward said longitudinal axis thereof, said tab members being arranged along the longitudinal axis of said tubular member in sets of at least two, the tab members of each of said sets being located in the same plane, said plane being substantially perpendicular to said longitudinal axis of said tubular member.

13. The stub-out cover of claim 12 wherein each of said tab members has a triangular shape.

14. The stub-out cover of claim 12 wherein said tubular member has an inside diameter larger than the outside diameter of the stub-out line to be protected, said tab members having a length greater than the distance between said inner wall of said tubular member and the outer surface of said stub-out line, whereby when said stub-out cover is placed over said stub-out, said tab members bend to tightly engage said outer surface of said stub-out.

15. The stub-out cover of claim 12 wherein the location on the inner surface of said tubular member of the tab members of one set are offset from the location on the inner surface of tab members of adjacent sets in a manner adapted to maximize circumferential contact of the outer surface of a stub-out over which the stub-out cover is placed.

16. The stub-out cover of claim 12 wherein each of said sets are comprised of two tab members located substantially opposite each other.

17. The stub out cover of claim 16 wherein the location on the inner surface of said tubular member of the tab members of one set are substantially 90 degrees out-of-phase with the location on the inner surface of said tubular member of the tab members of adjacent sets.

18. The stub-out cover of claim 10 wherein said closed end of said tubular member is enlarged and adapted to receive the closed end of a nipple sealed stub-out.

19. The stub-out cover of claim 10 wherein said tubular member is coded to indicate the nature of the fluid to be conducted through said stub-out.

20. The stub-out cover of claim 19 wherein said tubular member is color coded.

21. The stub-out cover of claim 20 wherein said tubular member is colored blue to indicate a cover for a cold water line stub-out, colored red to indicate a cover for a hot water line stub-out, colored yellow to indicate a medical air line stub-out, and colored green to indicate an oxygen line stub-out.

* * * * *